United States Patent

[11] 3,542,417

| [72] | Inventor | Bruce B. Mohs |
| | | Rte 1, Waunakee, Wisconsin 53597 |
| [21] | Appl. No. | 765,393 |
| [22] | Filed | Oct. 7, 1968 |
| [45] | Patented | Nov. 24, 1970 |

[54] REAR ENTRY DOOR FOR AUTOMOBILES
4 Claims, 4 Drawing Figs.

[52] U.S. Cl..................................................... 296/146, 296/137
[51] Int. Cl..................................................... B60j 5/10
[50] Field of Search......................................... 296/146, 56, 137, 76; 49/381, 401, 402

[56] References Cited
UNITED STATES PATENTS
2,947,567  8/1960  Barenyi........................ 296/137

FOREIGN PATENTS
1,403,032  5/1964  France........................ 296/56

*Primary Examiner*—Banjamin Hersh
*Assistant Examiner*—Robert R. Song
*Attorneys*—Joseph G. Werner, Theodore J. Long, John M. Winter and James A. Kemmeter ABSTRACT: A safety door for automobiles extending upwardly and forwardly from the rear of the automobile between two laterally spaced cantilevered roof beams and forming part of the roof. The door pivots upwardly from a closed position to an open position with the aid of a spring mechanism. A step platform at the rear of the automobile pivots up against the door in closed position and pivots down to an open position to permit entry into the automobile. The platform pivots in response to the opening and closing of the door.

Patented Nov. 24, 1970

BRUCE B. MOHS *INVENTOR.*

*Joseph G. Werner*
*John M. Winter*

BY ATTORNEYS

REAR ENTRY DOOR FOR AUTOMOBILES

BACKGROUND OF THE INVENTION

1. Field of the Invention

My invention relates to a vertically pivotable rear entry automobile door construction which forms part of the roof of the vehicle.

2. Description of the Prior Art

Since the invention of the automobile, the means of entry, with certain foreign exceptions, has typically been through side doors on the vehicle These side doors are fixed to the automobile frame by means of hinges on one side allowing them to swing open to permit entry and exit. This type of door closes by means of a latch which snaps into a connection mounted on the frame. This latch arrangement may be locked into position after the door is closed.

Side doors, though seemingly a permanent feature of the automobile, have several mechanical, safety and comfort disadvantages. Side doors must necessarily be separate from the main body frame of the car and must contain any windows along the side of the vehicle. Therefore, the door must be a hollow member inserted in the frame of the vehicle. This not only means that a side door is liable to great damage from any kind of direct force, but it also means the occupants of the vehicle are susceptible to injury because of the small amount of protection the side door really affords. The side door must seat tightly yet open easily, but both of these functions depend upon the proper alinement of the hinges which may be upset by a slight bumping of the door while in an open position.

The lock mechanism of the door, while it has been improved in recent years, will still not prevent the side door from flying open and exposing the occupant to increased danger following a violent impact.

Since the side door offers no support to the vehicle as a whole, but is support dependent, vision-obscuring window posts are common on most automobiles as part of a supporting door frame.

From the standpoint of comfort, entry into or exit from an automobile from the side demands an unnatural, and, in most cases, an extremely ungraceful combined horizontal and vertical body movement. Improper execution of these movements may result in injury and their execution is often particularly difficult for people of advanced years.

SUMMARY OF THE INVENTION

My invention of a rear entry door for automobiles not only solves many of the problems created by the design and operation of side doors but also makes a significant contribution to the safety of the automobile as a whole.

My pivotable rear entry door permits the sides of the automobile to be integrally constructed as one, continuous, solid unit with the rest of the vehicle By employing a rear door rather than side doors, my invention reduces the weak spots in the sides of the vehicle which necessarily fail under the impact of a high-speed collision.

Since my rear entry door allows the side of the vehicle to be fabricated on a continuous side beam, it removes the necessity for vision-obscuring door and window-frame posts.

My rear entry door also eliminates the possibility that the occupants of the vehicle will be thrown out of the vehicle through side doors thrown out of the vehicle through side doors thrown open as a result of a collision. Even if the rear entry door should come open upon impact it is unlikely that the occupants, who are not in close proximity to the door, will be ejected through the opening. As modern safety statistics have illustrated, an occupant who remains in an automobile after impact has a greater chance of survival than an occupant who is thrown from a vehicle.

My rear entry door completely solves the problems of comfortable and gracious entrance and exit posed by the side door. My door lifts easily with the aid of dual spring mechanisms to such a height that easy and graceful standing exit and entry is permitted. The step platform at the rear of the body frame, swings down as the door is lifted to permit a safe and easy means of entry.

Present day automobile design, because of the presence of side doors, makes it essentially impossible to fabricate a continuous body frame. Furthermore, they have a lightly reinforced roof which may collapse on the occupants when subjected to a direct force. My rear entry door, however, closes onto two very strong, laterally spaced, cantilevered roof beams. These two beams, which support the door, also prevent the roof from collapsing on the passengers under a substantial force such as might be imparted should the vehicle overturn.

Other objects, features and advantages of my invention will be apparent from the following detailed description taken in conjunction with the accompanying drawings wherein several preferred embodiments of my invention have been selected for exemplification.

DESCRIPTION OF THE PREFERRED EMBODIMENT

Figure 1:
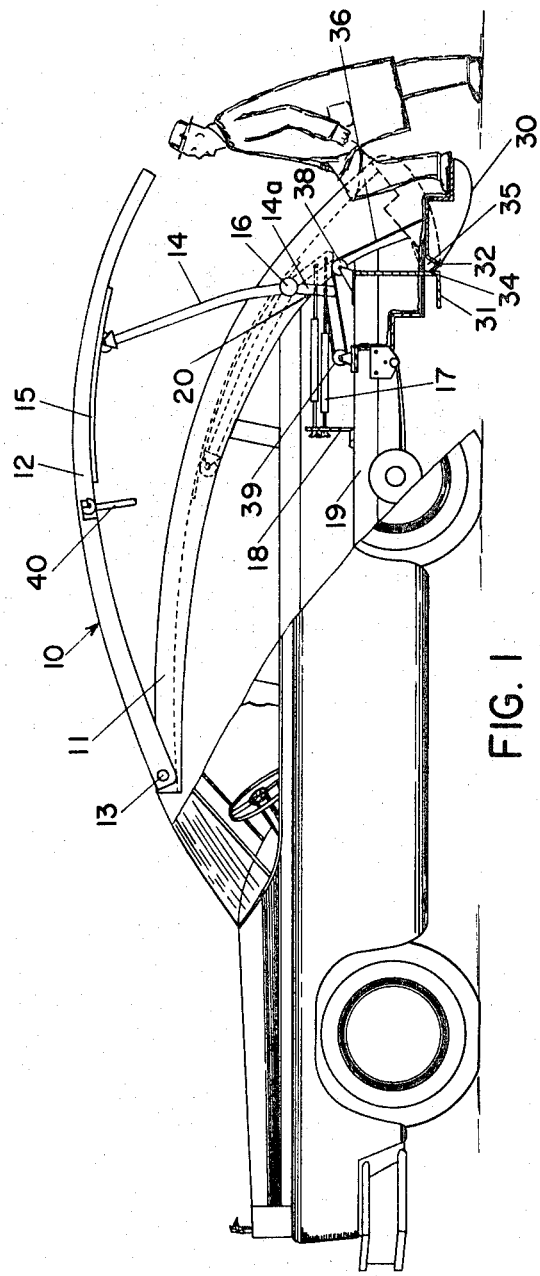
FIG. 1 is a side elevation view of an automobile with a portion broken away to show my rear entry door in open position. The phantom lines show the door in closed position.
Figure 2:
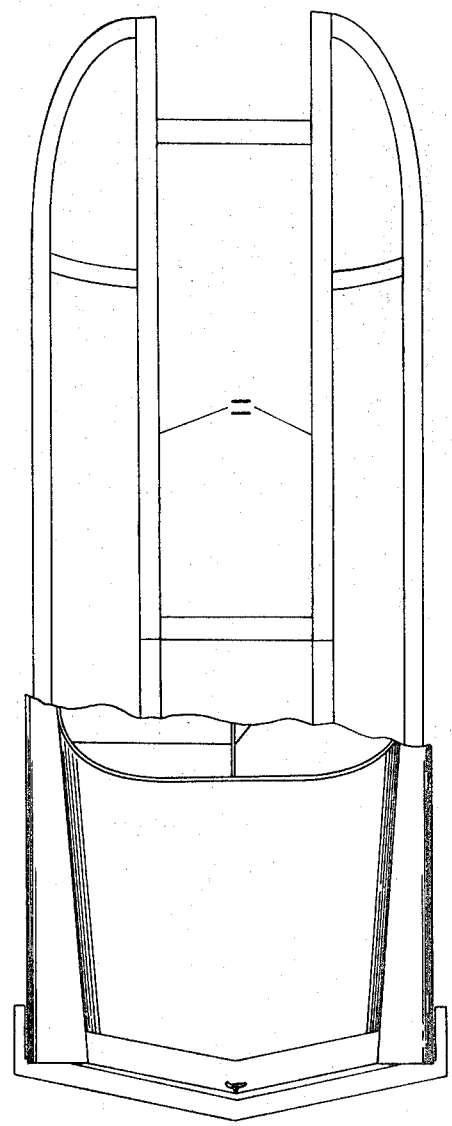
FIG. 2 is a top view of the automobile shown in FIG. 1 with a portion broken away to show the body frame members supporting the rear entry door.

Referring now more particularly to the drawings wherein like numerals refer to like parts throughout the several views, my rear entry door construction is generally shown at 10, in FIG. 1. This embodiment of the rear entry door construction comprises a pair of upwardly and forwardly extending laterally spaced roof beams 11, to which a similarly contoured door 12 is attached by means of a pivot connection 13 at the forward ends of the roof beams. The pivotal connection 13 at the forward ends of the roof beams allows the door to pivot upward to an open position shown in full lines in FIGS. 1 and 3, and to a lower, closed position shown in phantom in FIG. 1. In closed position, the door rests on the cantilevered roof beams and a portion of the thickness of the door extends downwardly between the roof beams.

Two laterally spaced elongated supporting arms 14 slidably engage metal runner plates 15 which are fixed to the underside of the door 12. The upper ends of the supporting arms having rollers 16 mounted thereon for rolling on the runner plates. The supporting arms are attached to the cantilevered roof beams by means of a pivot connection 16 near their lower end. A lower portion 14a of each of the metal supporting arms 14 extends below the pivot connection 16. A pair of tension springs 17 are attached to the lower portion 14a of each of the supporting arms 14. The springs 17 are securely bolted at their forward end to an L-shaped metal bracket 18 which is rigidly attached to a lower horizontal frame member 19.

When door 12 is in its lower, closed position as shown in phantom in FIG. 1, the springs 17 attached to each supporting arm 14 are in an extended position, exerting a constant tension on the supporting arms. In this position, the supporting arms lie parallel with the roof beams 11. When the door is unlatched to permit entry, the tension exerted by springs 17, pulls the lower portion 14a of the supporting arms forward so that the rollers on the upper ends of the arms slidably engaging runner plates 15 on the door move rearwardly on the runner plates, thus, pushing the door to its upper open position. Metal lugs 20 rigidly fixed to the roof beams below the pivot point 16 of the supporting arms stop the rotation of the arms in the upright position shown in FIG. 1.

The force exerted by the spring mechanism 17 is such that the door can be raised with just finger pressure by a person desiring to enter the automobile and the springs will hold the door in its open position.

A step platform 30, is mounted on steel hangers 31 at the rear of the body frame. The steel hangers 31 are rigidly fixed to the rear transverse body frame members 19. The step platform 30 is pivotable upward about a horizontal hinge 32 to meet the door 12 in a closed position and downwardly therefrom into a lower, open position to permit entry into the automobile.

A flat metal plate 33 is attached to the floor of the automobile by means of a hinge 34. The plate 19 bridges the V-shaped gap 35 between the step platform 30 and the floor of the automobile.

Figure 3:
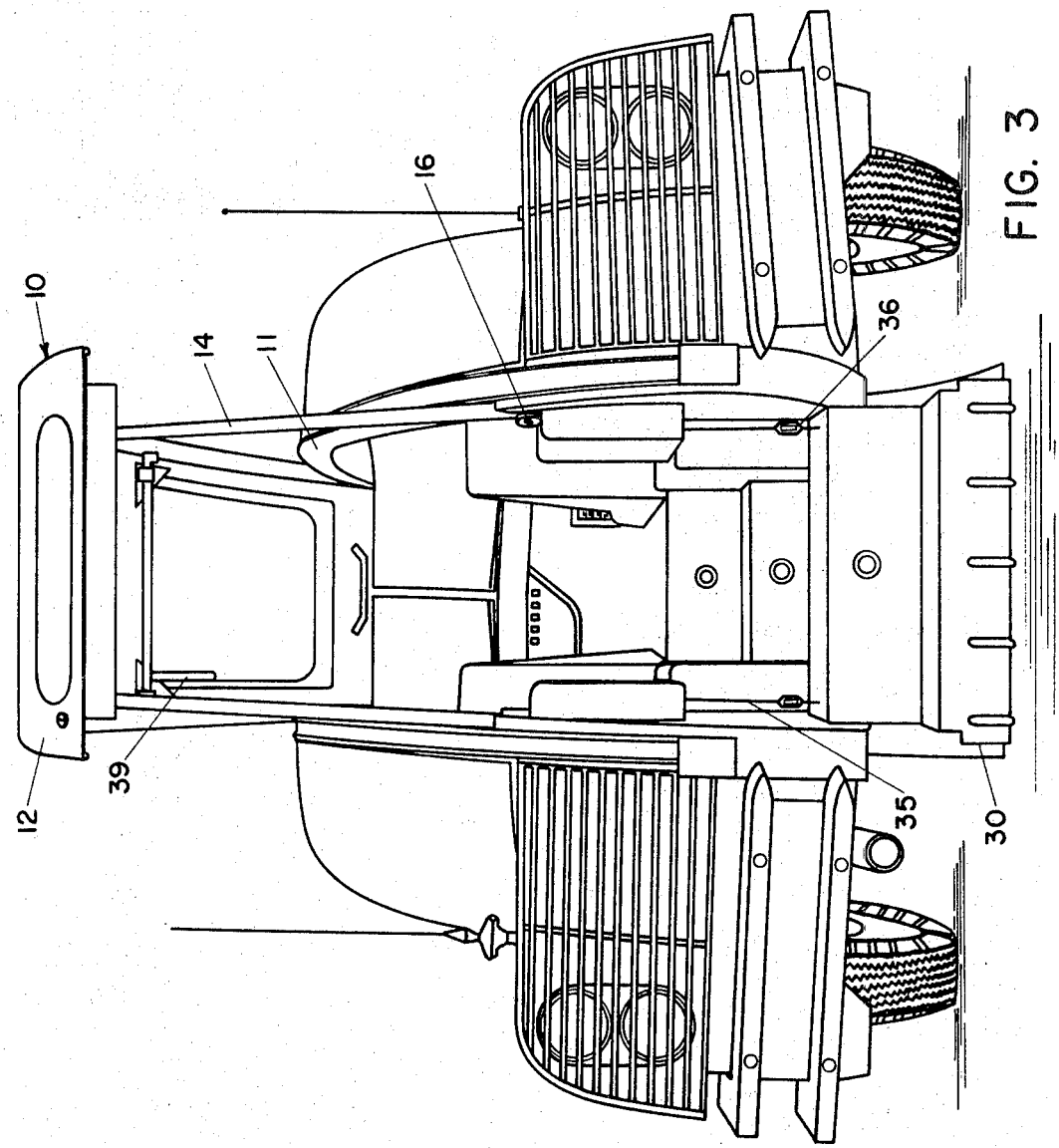
FIG. 3 is a rear elevation view of the rear entry door in its open position.
Figure 4:
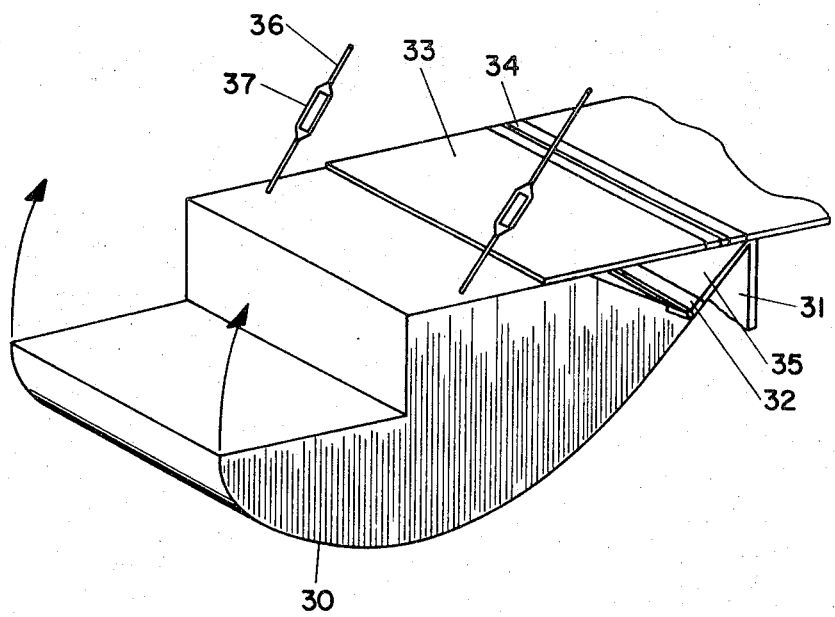
FIG. 4 is a fragmentary perspective view of a step platform forming a part of the rear entry door construction.

When the door 12 is in its upper, open position, the step platform is in its lower, open position to permit entry as shown in full lines in FIGS. 1 and 3. As the door is lowered to a closed position, abutting the end of the door 12 in a tight manner. The step platform 15 is rotated to its upper closed position by means of cables 36 attached to the step platform. The length of the cables 36 may be adjusted by means of eyebolts 37. The cables travel over pulleys, one of which is shown at 38 attached to the lower horizontal frame member 19 and around second pair of pulleys, one of which is shown at 39 also attached to the lower horizontal frame member. Cables 36 are attached to the lower portion of the supporting arms 14. When the lower portions of the supporting arms are swung rearwardly to bring the door 12 to its closed position, they also draw up the cables 36, thus pulling the step platform 30 up to its closed position. When the door 12 is opened, the lower portions 14a of the supporting arms pivot forwardly causing the cables 36 to be let out, thus, dropping the step platform to its open position.

When the step platform is open, a person wishing to enter the automobile merely walks up the steps into the vehicle. The door and step platform may then be closed by pulling down on latch 40 and pivoting it to lock the door in the closed position whereby the step platform is held in its closed position tightly against the end of the door by the steel cables 36. An outside latch may also be provided.

It is understood that my invention is not confined to the particular construction and arrangement of parts herein illustrated and described, but embraces all such modified forms thereof as come within the scope of the following claims.

I claim:

1. In an automobile, having a front and rear axle and a longitudinal corridor extending from the rear of the automobile to the forward seat thereof, a rear entry passenger door construction comprising:
   a. a body frame having a pair of upwardly and forwardly extending laterally spaced roof beams;
   b. a door having a substantially horizontal transverse pivotal axis positioned substantially forwardly of the rear axle and between and at the forward ends of said roof beams for pivotable movement between an upper open position and a lower closed position;
   c. spring means urging said door toward said upper open position; and
   d. latching means for releasably securing said door in said closed position.

2. The rear entry door construction for an automobile as specified in claim 1 having a step platform mounted at the rear of said body frame between said roof beams for pivotable movement between an upper position wherein it is closed against said door and a lower open position, and means for pivoting said step platform down into open position in response to the raising of said door and up into closed position in response to the lowering of said door.

3. The rear entry door construction for an automobile as specified in claim 1 having at least one elongate supporting arm pivotally attached to said body frame, said arm having an upper end slidably engaging said door and a lower end extending beyond the point of pivotal attachment of said arm, and said spring means being attached to the lower end of said support arm.

4. The rear entry door construction for an automobile as specified in claim 1 having at least one elongate supporting arm pivotally attached to said body frame, said arm having an upper end slidably engaging said door and a lower end extending beyond the point of pivotal attachment of said arm, said spring means being attached to the lower end of said support arm, a step platform mounted at the rear of said body frame between said roof beams for pivotably movement between an upper position wherein it is closed against said door and a lower position, and a cable attached to the lower end of said pivotable support arm and to said step platform for pivoting said step platform down into open position as said door is raised and up into closed position when said door is lowered.

UNITED STATES PATENT OFFICE
CERTIFICATE OF CORRECTION

Patent No. 3,542,417          Dated November 24, 1970

Inventor(s) Bruce B. Mohs

It is certified that error appears in the above-identified patent and that said Letters Patent are hereby corrected as shown below:

In the Specification:

Column 1, lines 63-64, delete the second occurring clause "thrown out of the vehicle through side doors".

In the Claims:

Column 4, line 38, the word "pivotably" should be changed to "pivotable".

FEB. 9, 1971

(SEAL)
Attest:

Edward M. Fletcher, Jr.          WILLIAM E. SCHUYLER, JR.
Attesting Officer          Commissioner of Patents